United States Patent
Docy et al.

(10) Patent No.: US 6,298,712 B1
(45) Date of Patent: Oct. 9, 2001

(54) FUEL CAP TESTER

(75) Inventors: Michael J. Docy, Cleveland; George R. Hart, Brunswick; Robert L. Bauman, Cleveland Heights, all of OH (US)

(73) Assignee: Hickok Incorporated, Cleveland, OH (US)

( * ) Notice: Subject to any disclaimer, the term of this patent is extended or adjusted under 35 U.S.C. 154(b) by 0 days.

(21) Appl. No.: 09/353,562

(22) Filed: Jul. 14, 1999

(51) Int. Cl.[7] .................................................. G01M 3/04
(52) U.S. Cl. .................................................. 73/49.7; 73/40
(58) Field of Search ........................... 73/37, 40, 40.5 R, 73/49.7, 49.8

(56) References Cited

U.S. PATENT DOCUMENTS

| | | | |
|---|---|---|---|
| 3,807,219 | * | 4/1974 | Wallskog ................................. 73/40 |
| 3,985,318 | * | 10/1976 | Dominey et al. .................. 244/17.11 |
| 4,164,861 | * | 8/1979 | Schlereth et al. ...................... 73/1 G |
| 4,575,807 | | 3/1986 | Dodge . |
| 4,791,811 | * | 12/1988 | Barbee ............................... 73/119 R |
| 5,020,362 | * | 6/1991 | Hart et al. .......................... 73/119 A |
| 5,295,392 | * | 3/1994 | Hensel et al. ......................... 73/49.5 |
| 5,323,640 | * | 6/1994 | Porcaro et al. .......................... 73/40 |
| 5,369,984 | | 12/1994 | Rogers et al. . |
| 5,390,645 | * | 2/1995 | Cook et al. .......................... 123/520 |
| 5,502,435 | * | 3/1996 | Ralston ................................ 340/632 |
| 5,507,176 | * | 4/1996 | Kammeraad et al. ................. 73/49.2 |
| 5,546,789 | * | 8/1996 | Balke et al. .............................. 73/40 |
| 5,561,240 | * | 10/1996 | Ochiai et al. ......................... 73/40.7 |
| 5,763,764 | * | 6/1998 | Mieczkowski et al. ................. 73/40 |
| 5,817,925 | * | 10/1998 | Cook et al. .............................. 73/40 |
| 5,847,264 | * | 12/1998 | Martin et al. ............................ 73/40 |
| 5,883,301 | * | 3/1999 | Pilippi et al. ..................... 73/40.5 R |
| 5,898,103 | * | 4/1999 | Denz et al. ............................ 73/49.2 |
| 5,952,559 | * | 9/1999 | Harris et al. .......................... 73/49.7 |
| 5,996,402 | * | 12/1999 | Harris .................................... 73/49.7 |
| 6,082,184 | * | 7/2000 | Lehmann .............................. 73/49.3 |

OTHER PUBLICATIONS

B. T. Neyer, J. T. Adams, T. S. Stoutenborough; Aerospace Leak Test Requirements, Jul. 2000, Proceeding of 36th Joint Propulsion Conference, Huntsville, AL., pp. 1–5.*

* cited by examiner

Primary Examiner—Hezron Williams
Assistant Examiner—C D Garber
(74) Attorney, Agent, or Firm—James A. Hudak

(57) ABSTRACT

An apparatus and a method for testing the integrity of fuel or gas caps for leaks is disclosed. A microprocessor controls the pressurization of an air reservoir which selectively allows air to pass to either the combination of the fuel cap under test and a reference orifice or to only the reference orifice and computes the ratio of the time required for the pressure within the air reservoir to drop between predetermined pressure levels for the combination of the fuel cap under test and the reference orifice versus only the reference orifice and compares same against a standard ratio to determine whether the leakage rate through the fuel cap meets an acceptable limit.

1 Claim, 3 Drawing Sheets

FUEL CAP TESTER

TECHNICAL FIELD

The present invention relates, in general, to a testing device for a fuel or gas cap and, more particularly, to a testing device which accurately and rapidly measures the rate of leakage of air and/or fuel vapors through a fuel or gas cap and compares same against a leakage rate standard for same so that those caps with leakage rates that exceed the standard can be readily identified.

BACKGROUND ART

The testing of the functional systems of vehicles has become quite sophisticated and requires extensive test procedures to ensure that the vehicle components are operating properly and that the overall system performance is in accordance with specific guidelines. The Federal Environmental Protection Administration (EPA) has established extensive regulations limiting emissions from motor vehicles. One area of particular interest is the vehicle fuel system. The loss of fuel through evaporation to the atmosphere is wasteful and environmentally harmful since fuel vapors contribute to unwanted hydrocarbon pollution. In an effort to limit such pollution, the EPA has proposed that fuel or gas caps be pressure tested. Testing apparatus and procedures have been developed to determine the integrity of fuel caps, however, such apparatus typically involve expensive flow rate measurement devices or utilize relatively low cost measurement devices that do not yield consistent results.

In view of the foregoing, it has become desirable to develop a more cost effective and efficient apparatus and method for testing the integrity of fuel or gas caps with respect to possible leakage of air and/or fuel vapors through same.

SUMMARY OF THE INVENTION

The present invention provides an apparatus and method for testing the integrity of fuel or gas caps for leaks. As such, the present invention includes a microprocessor which allows an air pressure source to pressurize an air reservoir to a predetermined first pressure. The microprocessor then permits air within the air reservoir to pass to the fuel or gas cap under test and also through a reference orifice until a predetermined second pressure has been reached at which time an internal timer within the microprocessor is actuated. The air continues to pass to the fuel or gas cap and through the reference orifice until a predetermined third pressure has been reached at which time the elapsed time on the internal timer is stored and a solenoid valve is deactuated stopping air flow to the fuel or gas cap under test. The air from the air reservoir is then allowed to continue to pass only through the reference orifice until a predetermined fourth pressure has been reached at which time the internal timer within the microprocessor is again actuated. Air continues to flow through the reference orifice until a predetermined fifth pressure has been reached at which time the elapsed time on the internal timer is stored. By comparing the ratio of the first elapsed time (air flow to the fuel or gas cap and through the reference orifice) with the second elapsed time (air flow through the reference orifice only) against a predetermined standard ratio, a determination can be made whether air and/or vapor leakage through the fuel or gas cap exceeds an acceptable limit.

DESCRIPTION OF THE PREFERRED EMBODIMENT

Figure 1:
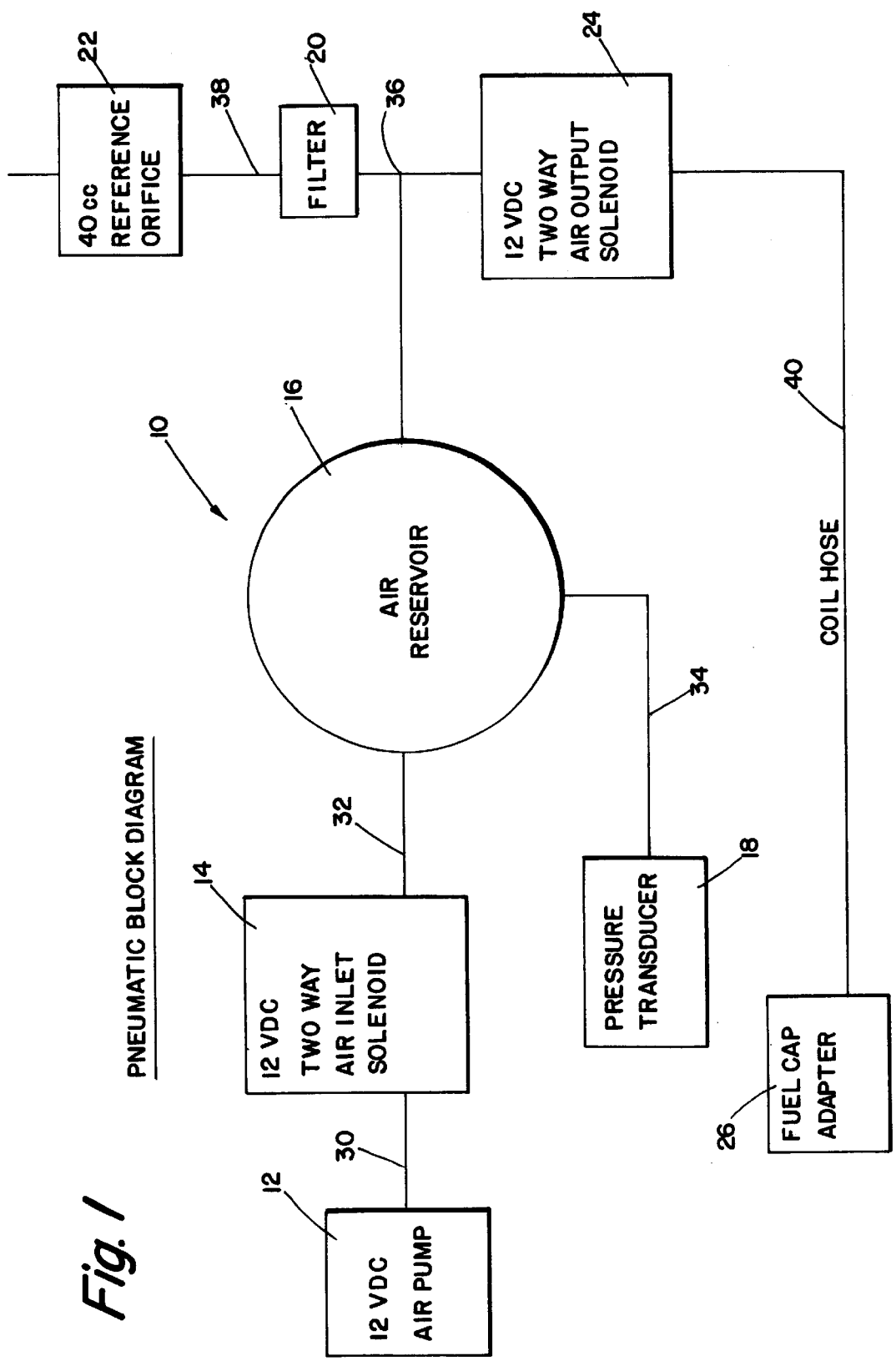
FIG. 1 is a schematic diagram illustrating the pneumatic circuit of the fuel cap tester of the present invention.

Referring now to the drawings where the illustrations are for the purpose of describing the preferred embodiment of the present invention and not intended to limit the invention described herein, FIG. 1 is a schematic drawing illustrating the pneumatic circuit for the fuel cap tester 10 of the present invention. As such, the pneumatic circuit includes an air pump 12, a 2-way air inlet solenoid valve 14, an air reservoir 16, a pressure transducer 18, a filter 20, a reference orifice 22, a 2-way air output solenoid valve 24 and a fuel cap adapter 26. The air pump 12 is powered by a 12 volts D.C. source (not shown) and its output is connected, via tubing 30, to the input to air inlet solenoid valve 14, which is also powered by the 12 volts D.C. source. The output of solenoid valve 14 is connected, via tubing 32, to an input to air reservoir 16. Pressure transducer 18 is also connected, via tubing 34, to another input to air reservoir 16 to monitor the air pressure therein. The output of air reservoir 16 is connected to a T-fitting 36 having one of its outputs connected to the input to filter 20 and the other of its outputs connected to the input to air output solenoid valve 24 which is also powered by the 12 volts D.C. source. The output of filter 20 is connected to the input to reference orifice 22 by tubing 38. The output of reference orifice 22 is allowed to vent to the atmosphere. The output of solenoid valve 24 is connected to the input to fuel cap adapter 26 by tubing 40. The fuel or gas cap to be tested (not shown) is attached to fuel cap adapter 26 for testing purposes.

Figure 2:
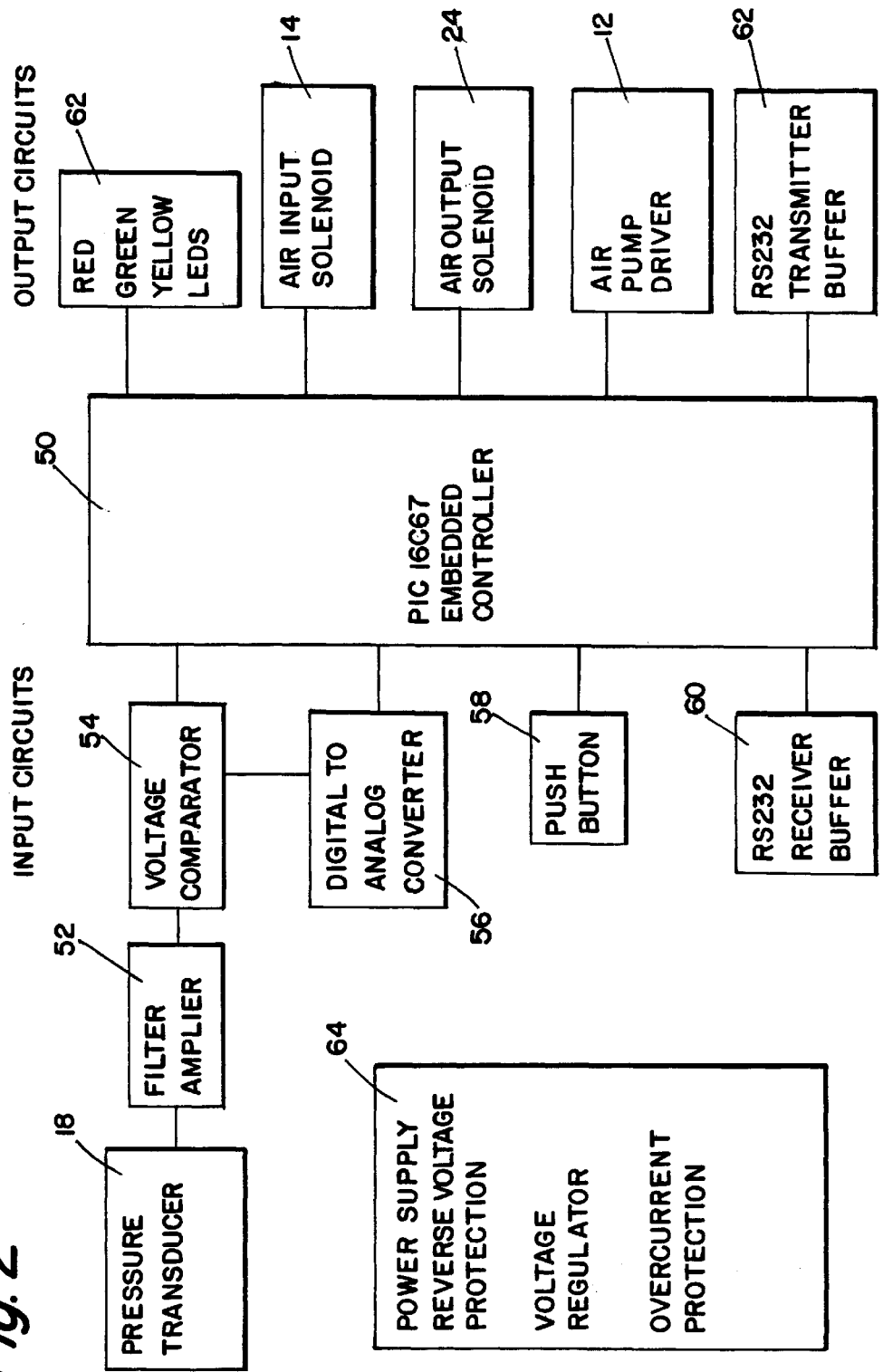
FIG. 2 is a schematic diagram of the electrical circuit utilized by the fuel cap tester of the present invention.

The pneumatic circuit for the fuel cap tester 10 illustrated schematically in FIG. 1 is controlled by the electrical circuit shown schematically in FIG. 2. In this latter Figure, those components which been already described with respect to FIG. 1 carry like reference numerals. The circuit illustrated in FIG. 2 is controlled by a microprocessor 50 having a plurality of input circuits and output circuits associated therewith. With respect to the input circuits, one input circuit (shown schematically) includes pressure transducer 18, a filter/amplifier 52, a voltage comparator 54 and a digital to analog converter 56. In this instance, the output of pressure transducer 18 is connected to the input to filter/amplifier 52 whose output is connected to the non-inverting input of voltage comparator 54. The analog output of digital to analog converter 56 is connected to the inverting input of voltage comparator 54. The output of voltage comparator 54 is connected to an input to microprocessor 50. An output from microprocessor 50 is connected to the digital input of analog to digital converter 56. Another input to microprocessor 50 is a push button 58 which is utilized to actuate the entire testing system. In addition, a RS232 receiver buffer 60 is connected to another input to microprocessor 50. With respect to the output circuits associated with microprocessor 50, separate outputs from microprocessor 50 are connected to a plurality of light emitting diodes 62 and to the separate inputs to solenoid valve 14, solenoid valve 24, air pump 12, and to an RS232 transmitter buffer 62. A power supply 64 is provided for the electrical requirements of this system and includes reverse voltage protection, voltage regulation and overcurrent protection.

During system assembly, some calibration values are permanently stored in a serial EEPROM associated with the microprocessor 50 and used during the fuel or gas cap testing procedure. Such values include air pump frequency, full scale calibration, zero value calibration and test ratio. With respect to air pump frequency, because of mechanical tolerances within the air pump 12, it is necessary to determine the most efficient driving frequency for the system and to store this value in the serial EEPROM for use during the fuel or gas cap testing process. As for full scale calibration, because of the electrical variation between pressure transducers 18, a source of 36 inches of water pressure is applied to pressure transducer 18 while the combination of the digital to analog converter 56, voltage comparator 54 and microprocessor 50 executes a successive approximation algorithm to digitize this pressure value for storage in the serial EEPROM. From this value, the digital value for one inch of water pressure is calculated by dividing the stored full scale value for same by 36. Regarding the zero value calibration, since the pressure transducer 18 is not zero compensated over a range of temperatures, a known zero water pressure value must be established before the testing system is operated and this zero pressure value must be added to the full scale pressure value to compensate for temperature. Because the air reservoir 16 might not be fully discharged between consecutive fuel or gas cap tests, a capacitor (not shown) having a 2.5 minute discharge period is charged by the microprocessor 50 through a blocking diode (not shown) each time the air reservoir 16 is pressurized. When the fuel or gas cap testing procedure is started, the charge on the capacitor is checked. If the capacitor is fully discharged, the digital to analog converter 56, voltage comparator 54 and microprocessor 50 combination, through the utilization of a successive approximation algorithm, digitizes the value of the output of the filter/amplifier 52 and stores this value in the serial EEPROM. If the capacitor is not fully discharged, the previously stored zero pressure value in the serial EEPROM is used. Lastly, with respect to the test ratio, during system calibration, an external 60 cc orifice is connected to the fuel cap adapter 26. and the same algorithm that is used in fuel or gas cap testing is executed. The test result (test ratio) is stored in the serial EEPROM and is used for comparison purposes during the actual fuel or gas cap testing procedure.

Figure 3:
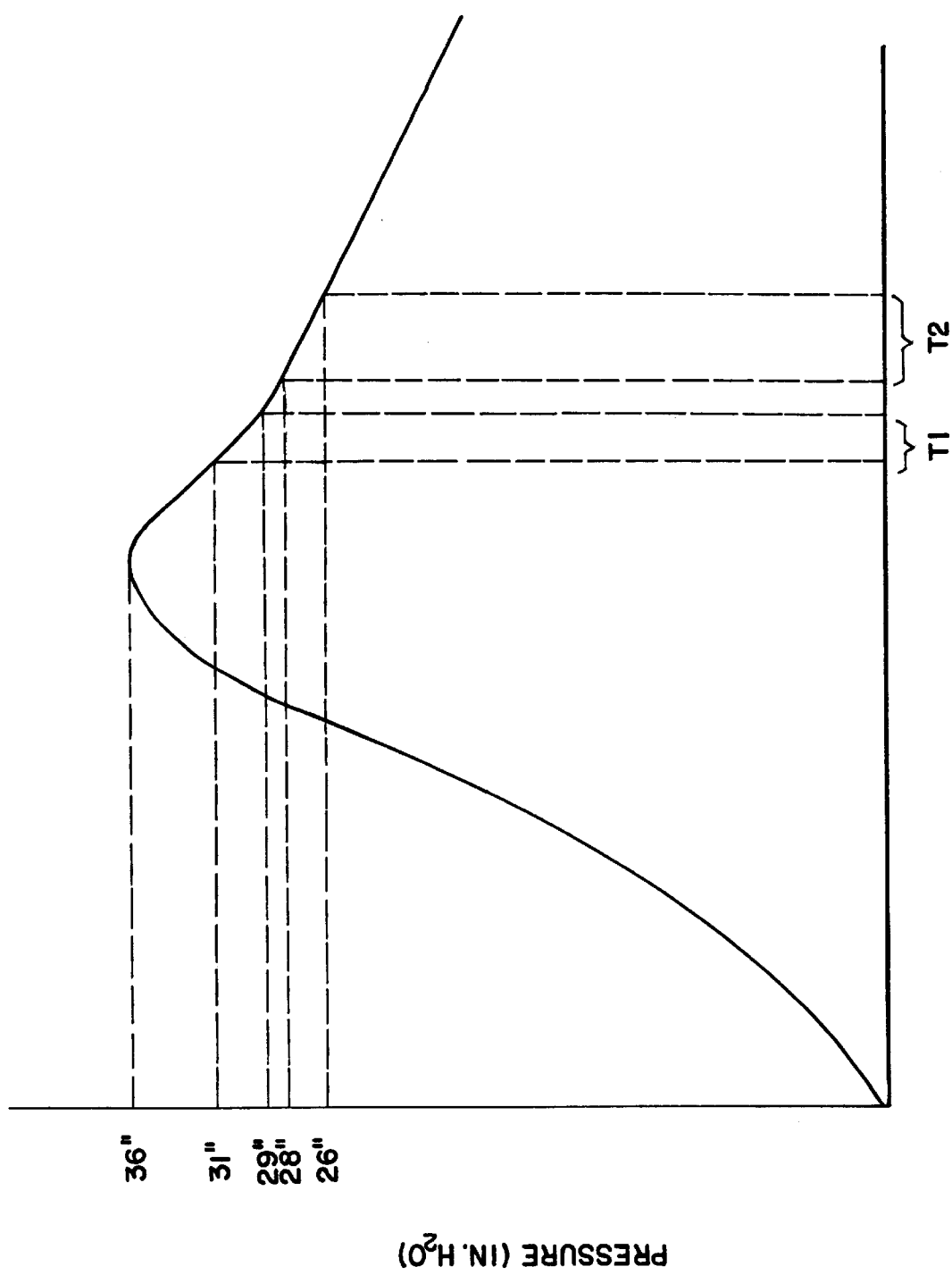
FIG. 3 is graph of pressure versus time illustrating the pressure drops which occur within the system of the present invention during a typical test of a fuel or gas cap.

Upon application of power to the system, the microprocessor 50 initializes all of its variables and its input/output ports. The microprocessor 50 also polls the port associated with the start push button 58. When the push button 58 is actuated, the microprocessor 50 actuates solenoid valve 24 causing it to open. The microprocessor 50 then "reads" the output of voltage comparator 54 and if the output is low indicating that the aforementioned capacitor is discharged, the microprocessor 50 performs an analog to digital conversion with respect to the pressure transducer 18 to obtain the zero pressure voltage and stores this value in the serial EEPROM. If the output of voltage comparator 54 is not low indicating that the aforementioned capacitor has not fully discharged, the microprocessor 50 utilizes the previously stored zero pressure voltage in the serial EEPROM. After the foregoing has occurred, the microprocessor 50 sets the output of the digital to analog converter 56 to the voltage corresponding to 36 inches of water pressure previously stored in the serial EEPROM. The microprocessor 50 then actuates the air pump 12 and solenoid valve 14 causing valve 14 to open allowing air reservoir 16 to be pressurized. When the output of the voltage comparator 54 goes high indicating that the air reservoir 16 has been pressurized to a pressure of 36 inches of water, solenoid valve 14 is then deactuated causing valve 14 to close preventing further pressurization of air reservoir 16. This is shown graphically in FIG. 3 which is a graph of pressure within the air reservoir versus time. The microprocessor 50 then sets the output of the digital to analog converter 56 to a voltage corresponding to 31 inches of water pressure and allows air to pass from the air reservoir 16 and leak through the fuel or gas cap under test and the reference orifice 22 causing the pressure within the air reservoir 16 to drop. The pressure drop or decay rate, referred to hereinafter as the first pressure decay rate, is allowed to stabilize. The microprocessor 50 then polls the output of the voltage comparator 54 until it goes low indicating that the pressure within the air reservoir 16 has dropped to 31 inches of water due to leakage through the fuel or gas cap under test and the reference orifice 22. When this latter pressure has been reached, the microprocessor 50 starts its internal timer and sets the output of the digital to analog converter 56 to a voltage corresponding to 29 inches of water pressure. The microprocessor 50 then polls the output of the voltage comparator 54 until it goes low indicating that the pressure within the air reservoir 16 has dropped to 29 inches of water. When this latter pressure has been reached, the microprocessor 50 stops its internal timer, stores the elapsed time in a random access memory, and deactuates solenoid valve 24 causing it to close. This elapsed time value is actually the time required for the leak through the reference orifice 22 and through the fuel or gas cap under test to cause the pressure within the air reservoir 16 to drop from 31 to 29 inches of water pressure. This time interval, which represents the first pressure decay rate, is subsequently referred to herein as T1.

Since microprocessor 50 has deactuated solenoid valve 24 causing it to close, the reference orifice 22 is the only leak within the system. The microprocessor 50 then sets the output of the digital to analog converter 56 to a voltage corresponding to 28 inches of water pressure and allows air to pass from the air reservoir 16 and leak through the reference orifice 22 causing the pressure within the air reservoir to drop. The pressure drop or decay rate, referred to hereinafter as the second decay rate, is allowed to stabilize. The microprocessor 50 then polls the output of the voltage comparator 54 until it goes low indicating that the pressure within air reservoir 16 has dropped to 28 inches of water. When this latter pressure has been reached, the microprocessor 50 starts its internal timer and sets the output of the digital to analog converter 56 to a voltage corresponding to 26 inches of water pressure. The microprocessor 50 then polls the output of the voltage comparator 54 until it goes low, thus indicating the pressure within air reservoir 16 has dropped to 26 inches of water. When this latter pressure has been reached, the microprocessor 50 stops its internal timer and stores the elapsed time in the random access memory. This elapsed time value is actually the time required for a leak through the reference orifice 22 to cause the pressure within air reservoir 16 to drop from 28 inches to 26 inches of water. This time interval, which represents the second pressure decay rate, is subsequently referred to herein as T2.

Utilizing the aforementioned time intervals or pressure decay rates of T2 and T1, the system divides T2 by T1 and the resulting ratio is compared to the test ratio that was previously stored in the serial EEPROM during the 60 cc calibration test. If the resulting ratio of T2/T1 is less than the test ratio, the microprocessor 50 actuates the green light emitting diode indicating that the fuel or gas cap passed the test satisfactorily. If, the ratio T2/T1 is greater than the test ratio, the microprocessor 50 actuates the red light emitting diode indicating that the fuel or gas cap failed the test.

Certain improvements and modifications will occur to those skilled in the art upon reading the foregoing. It should be understood that all such modifications and improvements have been deleted herein for the sake of conciseness and readability, but are properly within the scope of the following claims.

We claim:

1. A method for testing fuel caps comprising the steps of:
   a) pressurizing an air reservoir to a predetermined first pressure;
   b) permitting air within said air reservoir to pass to the fuel cap under test and also through a reference orifice until a predetermined second pressure has been reached;
   c) actuating a timer when said second predetermined pressure has been reached;
   d) allowing air from said air reservoir to continue to pass to the fuel cap under test and through said reference orifice until a predetermined third pressure has been reached;
   e) storing the elapsed time on the timer and stopping air flow from said air reservoir to the fuel cap under test;
   f) allowing air from said air reservoir to continue to pass to said reference orifice until a predetermined fourth pressure has been reached;
   g) actuating said timer when said predetermined fourth pressure has been reached;
   h) allowing air from said air reservoir to continue to flow to said reference orifice until a predetermined fifth pressure has been reached;
   i) storing the elapsed time on the timer; and
   j) comparing the ratio of the first stored time with the second stored time against a predetermined standard ratio to determine whether the fuel cap under test has an acceptable leakage rate.

* * * * *